United States Patent [19]

Mastors

[11] Patent Number: 5,740,432
[45] Date of Patent: Apr. 14, 1998

[54] LOG FILE OPTIMIZATION IN A CLIENT/ SERVER COMPUTING SYSTEM

[75] Inventor: Robert Mastors, Colorado Springs, Colo.

[73] Assignee: Sun Microsystems, Inc., Mountain View, Calif.

[21] Appl. No.: 654,330

[22] Filed: May 28, 1996

[51] Int. Cl.$^6$ .................................................. G06F 17/30
[52] U.S. Cl. ........................................ 395/618; 395/182.18
[58] Field of Search .................................. 395/616, 617, 395/618, 619, 610, 182.18, 200.12, 200.03

[56] References Cited

U.S. PATENT DOCUMENTS 5,537,588  7/1996  Englemann et al. .................. 395/618

FOREIGN PATENT DOCUMENTS

WO 95 24685 A  9/1995  WIPO .

OTHER PUBLICATIONS

Michael N. Nelsou, "Generic Support for Caching and Disconnected Operation", Workstation Operating Systems, 1993, pp. 61–65.

M. Satyanarayanan et al., "On the Vbiquity of Logging in Distributed File Systems", Workstation Operating Systems, 1992, pp. 122–125.

James J. Kistler et al., "Disconneted Operatin in the Coda File System", ACM Transactions on Computer Systems, vol. 10, No. 1, Feb. 1992, pp. 3–25.

"Disconnected Operation", http://www.cs.sunysb.ed/~cchang/paper/g.20html, date unkown.

Puneet Kuman, "Coping with Conflicts in an Optimistically Replicated File System", 1990 Workshop on Management of Replicated Data, IEEE, 1990, pp. 60–64.

James J. Kistler, "Increasing File System Availability through Second–Class Replication", 1990 Workshop on Management of Replicated Data, IEEE, 1990, pp. 65–69.

ACM Transactions on Computer Systems, vol. 10, No. 1, 1 Feb. 1992, pp. 3–25, Kistler J., "Disconnected Operation in the Coda File System".

Proceedings of the Usenix Mobile and Location–Independent Computing Symposium, 2 Aug. 1993, pp. 1–10, Huston L., "Disconnected Operation for AFS".

*Primary Examiner*—Paul V. Kulik
*Attorney, Agent, or Firm*—William J. Kubida; Homer L. Knearl; Holland & Hart LLP

[57] ABSTRACT

In a client/server computing system, a method and apparatus for efficiently storing entries in a log file during disconnected client operations. An encoder utilizes a log file and a write file table for logging the write operations performed by the client during disconnected operations. The logging method employed by the encoding module logs in the log file only writes associated for different files. The encoding module tracks the status of the entries in the log file with a write file table containing the most recent sequence number associated with a file entry of the log file. Upon reconnection of the client to the server, a decoding module replays the events in the correct chronological order by transferring the file data modified during the period of disconnection in the order dictated by the write file table. A deferred write list is accessed by the decoding module for temporary storage any write operations whose replay should be delayed to preserve the relative order of events.

3 Claims, 7 Drawing Sheets

60 — EVENT 1: WRITE TO FILE A
62 — EVENT 2: WRITE TO FILE B
64 — EVENT 3: WRITE TO FILE A

Fig. 3A

LOG FILE (50)

| RECORD # (70) | FILE NAME (72) | SEQUENCE # (74) |
|---|---|---|
| 1 | A | 1 |
| 2 | B | 2 |
| 3 | X | 3 |

Fig. 3B

WRITE FILE TABLE (56)

| FILE NAME (72) | SEQUENCE # (76) | WRITTEN_FLAG (78) |
|---|---|---|
| A | 3 | 1 |
| B | 2 | 1 |
| C | 0 | 0 |
| X | 2 | 1 |

Fig. 3C

LOG FILE OPTIMIZATION IN A CLIENT/ SERVER COMPUTING SYSTEM

BACKGROUND OF THE INVENTION

1. Field of the Invention

The present invention relates to write operations performed by a client computing station in a client/server computing system while the server or network is inoperative. More particularly, the present invention relates to management of log files maintained in the client by reducing the number of entries placed in the log file during a period of server or network unavailability.

2. Description of Related Art

In a client/server computing system operating over a network, file system architectures are employed in which the server stores all files created at the client in the computing system. In such a computing system, when an application program, operating on the client, needs to write data to a file, the file data is transferred over the network to the server for storage in the file maintained by the server. If the client is equipped with a local disk cache, the data is also optionally written to the local disk cache of the client. Under normal operating conditions, such a computing system can operate smoothly.

However, when the server becomes inoperative (i.e., crashes) or if the network connection between the server and the client becomes inoperative, then the client is unable to transfer new file data over the network to the server for storage therein as would normally be done. This period of server unavailability is also referred to as disconnected operations.

In order to make the client/server computing system more fault-tolerant, it is desirable to enable the user of an application program running on the client to be able to modify or write data to a file even during unavailability of the server.

During the period of server unavailability, a log file can be created and maintained in the client for collecting a list of operations performed by the client during the period of unavailability of the server. The log file generally includes the type of operation performed and the data associated with the operation, along with an identification of the file upon which the operation was performed. Once the server again becomes available, the client utilizes the log file to "replay" or "roll" the operations performed during the unavailability of the server, thereby attempting to insure the consistency between the server's version of the file and the client's version of the file.

Client operations involving file modifications (i.e., writing data to a file) during the unavailability of the server are of particular importance. Conventional log file techniques generally utilize a linear logging technique wherein all write file operations are sequentially entered into a single log file.

The linear logging technique has the disadvantage that the size of the log file can become quite large during extended periods of server unavailability, since each write operation performed to a file is separately entered in the log file. For instance, if a user running an application on the client modifies the same file 1,000 times during a period of server unavailability, the conventional linear logging technique would create 1,000 separate entries in the log file. A large log file is disadvantageous because during periods of server unavailability, the client's memory/storage space can become an extremely scarce resource, since the server is generally designed to have substantially greater file storage abilities than the client. If the growing size of the log file exceeds the client's memory/storage capabilities, then it is possible that the client could no longer process and store new data being provided by the user to the application program running on the client. Hence, operations on the client would have to be suspended under this scenario until the server again becomes available.

Furthermore, each entry placed into the log file requires processing time by the client. Where the client utilizes a disk cache for persistent storage, each write of data to the log file is associated with a period of disk processing time. Therefore, it is advantageous to minimize the number of entries placed in the log file to improve the performance of the client.

It is also important that the relative ordering of the file modifications listed in the log file is preserved. For example, if during disconnected operations, a file A was modified by the user at the client after a file B was modified, it is important that this relative order of file modifications is preserved. In some client/server computing systems, the server will maintain a modification time for each file, and update this modification time whenever the server modifies the file by writing data to the file. This modification time is utilized by many conventional software programs, such as the "makefile" compilation utility, to track the state of a file.

Therefore, the client should, during the "rolling" or replaying of the log file after the server has again become available, transfer the modified file data to the server in an order which accurately reflects the relative order in which the files were modified by the user on the client during disconnected operations.

SUMMARY OF THE INVENTION

In accordance with the present invention, the above problems have been solved by a method for reducing the number of entries placed in a log file during disconnected client write operations. A write file table is created for tracking the file name and a sequence number of entries placed in the log file during disconnected operations. A count is maintained of the sequence number of a present write operation, and the log file is encoded with entries identifying the file name and the sequence number of the present write operation. A first condition is detected wherein if the present write operation operates on the same file as a prior write operation, only the write file table entry is updated with the latest sequence number corresponding to the present write operation. Hence, no additional entry for the present file is created in the log file.

Upon reconnection of the client to the server, the write operations performed by the client during disconnected operations are replayed in the proper sequential order by transferring the file data over the network to the server for storage therein. A deferred write list is created for temporarily storing operations which should not be replayed in order to preserve the correct sequence of disconnected operations. For any entry from the log file being processed, if the sequence number of the entry from the log file does not match the sequence number of entry in the write file table, then the entry should be placed in the deferred write list for replaying at a later time.

The above computer implemented steps in another implementation of the invention are provided as an article of manufacture, i.e., a computer storage medium containing a computer program of instructions for performing the above described steps.

In a machine implementation of the invention, an apparatus for efficiently replaying the entries placed in a log file during disconnected client write operations has an encoding module and a decoding module. The encoding module places entries in the log file and in a write file table for tracking the state of the log file. The encoding module logs in the log file only writes associated for different files. Upon reconnection of the client to the server, the decoding module replays the events in the correct chronological order by transferring the file data modified during the period of disconnection in the order dictated by the write file table. The decoding module replays the write operations by accessing the log file and the write file table. The decoding module places entries in a deferred write list for temporary storage and subsequent replaying at the appropriate moment.

The great utility of the present invention is that the number of entries in the log file maintained by the client during disconnected operations are substantially reduced, thereby reducing the amount of memory/storage space consumed by the log file during the period of server unavailability. In this manner, the present invention permits an efficient storage of file data created by the user at a client workstation while the server is unavailable.

Still another utility of the present invention is that the number of entries written to the log file are reduced, thereby reducing the amount of client processing associated with these log file write operations.

Still another utility of the present invention is that the relative order of files modified during server unavailability is preserved in the client's "replay" or "rolling" of the log file after the server has become available.

Still another utility of the present invention is that the present invention can be incorporated into an existing client/server computing system without modification to either the server file system implementation or the client-to-server file system protocol.

The foregoing and other features, utilities, and advantages of the invention will be apparent from the following more particular description of a preferred embodiment of the invention as illustrated in the accompanying drawings.

BRIEF DESCRIPTION OF DRAWINGS

FIG. 3A is an illustrative example of a sequence of three events which occur on the client during a period of server unavailability.

FIG. 3B illustrates a log file utilized in the preferred embodiment of the present invention.

FIG. 3C illustrates a write file table utilized by the preferred embodiment of the present invention.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The operating environment, in which the present invention is used, encompasses a standalone computing system as well as the general distributed computing system. In the distributed computing system, general purpose computers, workstations, or personal computers are connected in a client-server arrangement via communication links of various types, wherein programs and data, many in the form of objects, are made available by various members of the system.

Figure 1:
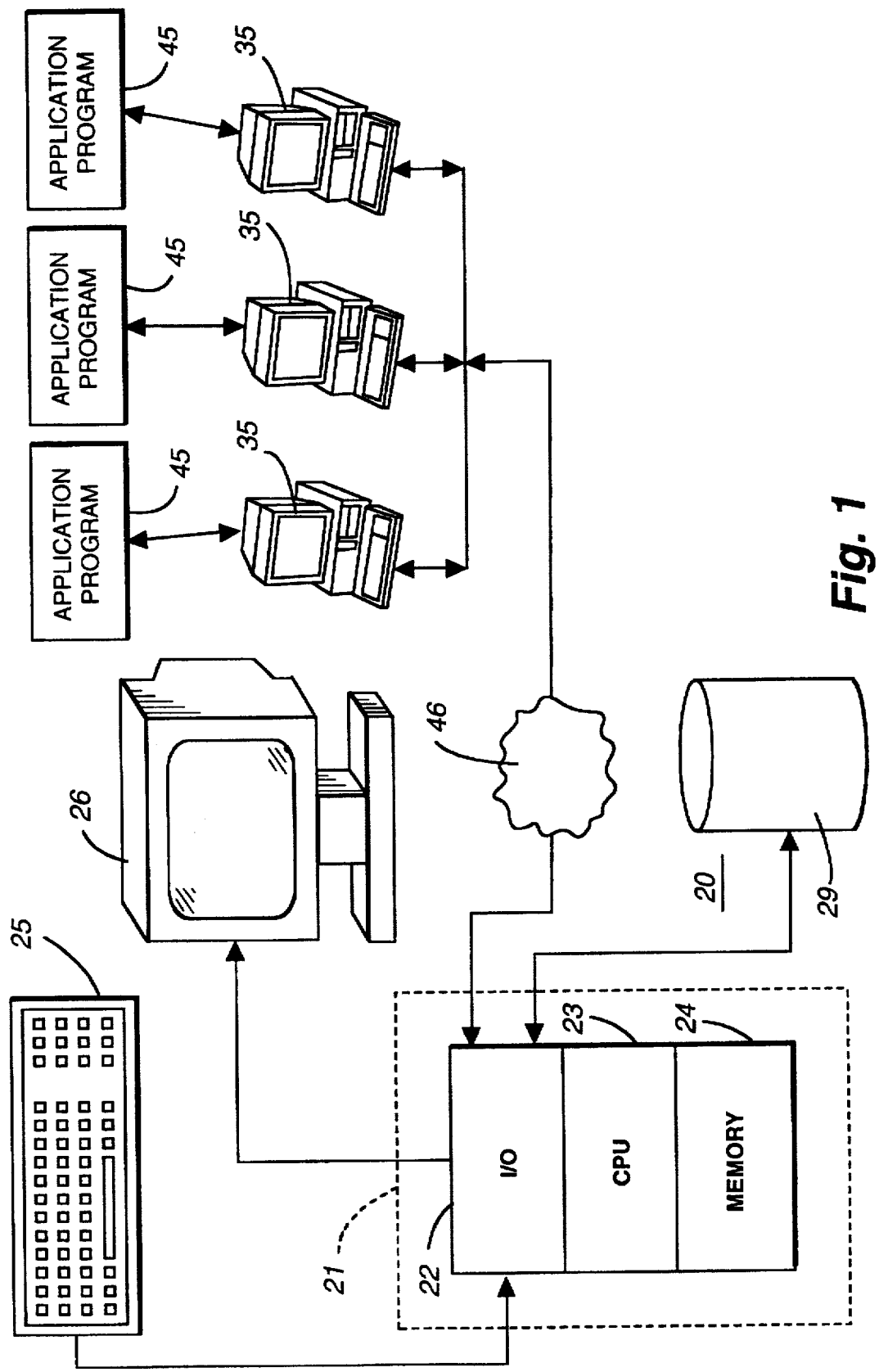
FIG. 1 illustrates a distributed processing computer system with a server and multiple clients connected in a communications network to perform the logical operations of the invention.

Some of the elements of a standalone computer or a general purpose workstation computer are shown in FIG. 1. In accordance with the invention, users at remote workstations in a network, such as client processors 35, communicate through the network to a computer server 20. Server 20 includes processor 21 having an input/output section 22, a central processing unit 23, and a memory section 24. The input/output section 22 is optionally connected to a keyboard 25, a display or monitor 26, and a disk storage unit 29. The input/output unit 22 includes a communications adaptor (not shown) for communicating on the network 46 to the remote client stations 35.

Application programs 45 operate on client station 35 which may access or modify files maintained by server 20. The computer program products to effectuate the apparatus and methods of the present invention may reside in the memory section 24, or on the disk storage unit 29 or similar storage media (not shown), or reside on storage mediums used by clients 35. Examples of computing systems that may be used as either a server 20 or a client 35 include the SPARC[1]™ systems offered by Sun Microsystems™, Incorporated, personal computers offered by IBM Corporation and by other manufacturers of IBM compatible personal computers and systems running the UNIX[2], OS/2[3], HP-UX, AIX[3], DOS etc. operating systems.

[1] SPARC is a trademark of Sun Microsystems, Inc.
[2] UNIX is a trademark Licensed by X/Open Company Ltd.
[3] OS/2 and AIX are trademarks of IBM Corporation.

Figure 2:
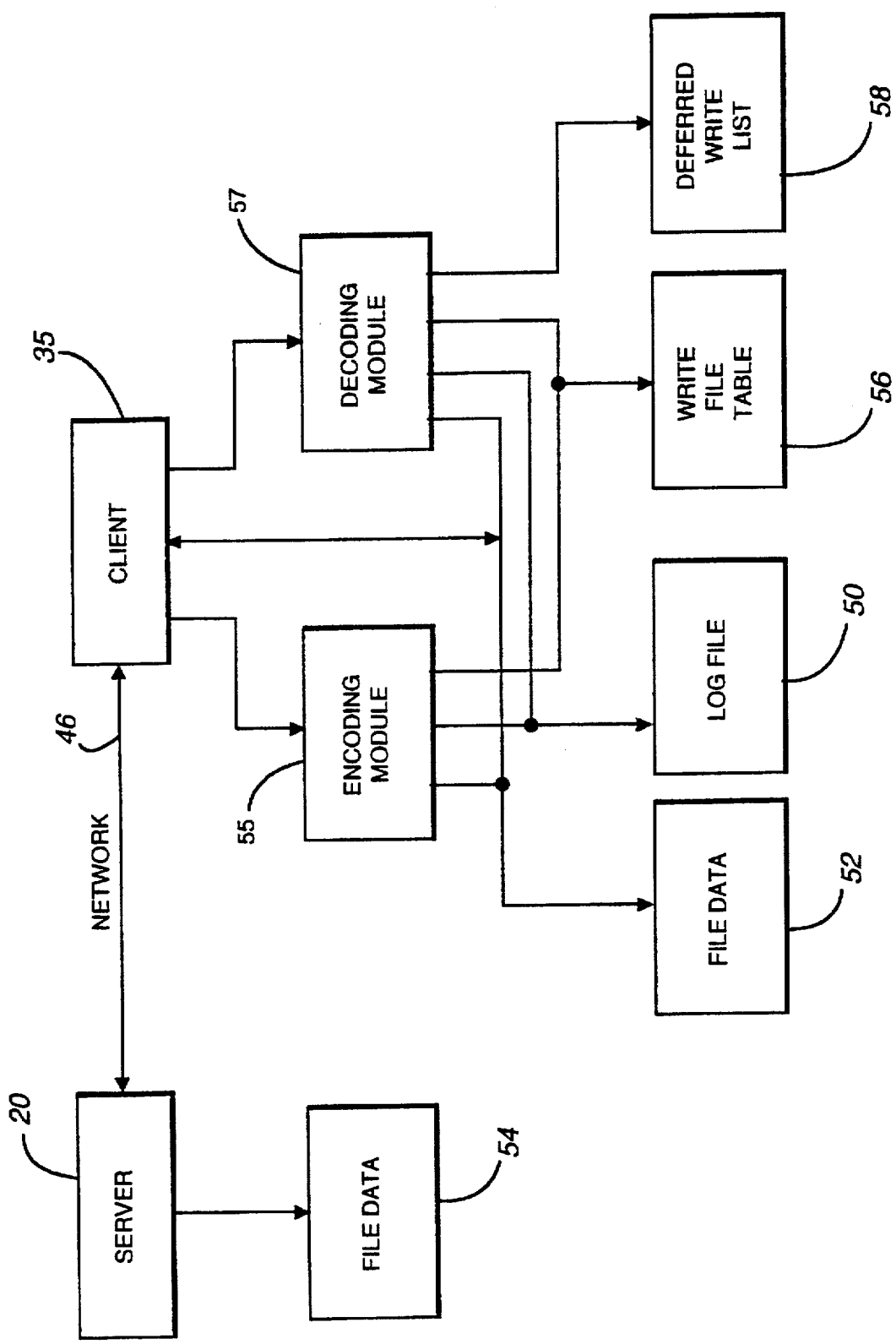
FIG. 2 is a block diagram of the preferred embodiment of the present invention.

As shown in FIGS. 1–2, client 35 and server 20 communicate over network 46 which provides client 35 with access to the files maintained on disk 29 of the server. Conversely, client 35 also transfers file data over network 46 for files maintained on the server.

The client generally creates file data in response to a request by an application program 45 (FIG. 1), running on the client 35, to store or write data associated with a file. If server 20 is unavailable either because the network connection 46 is inoperative, server 20 has crashed, or otherwise, then the client 35 cannot transfer the file data to the server. As will be explained, the present invention permits the client to transfer file data to the server, despite the unavailability of the server, by the efficient use of a log file, a write file table, and a deferred write list.

FIG. 2 illustrates the preferred embodiment of the present invention. Client 35 has a write file table 56, a deferred write list 58, a log file 50, and file data 52. File data block 52 represents the various files maintained in the client, and each file is assumed to have an identifier such as a file name. For example, if files A, B, and C exist on the client 35, then these files would be contained in file data block 52.

As previously described, when client 35 writes or modifies file data 52, the client 35 normally transmits this data over network 46 to server 20 to be stored as file data 54 by server 20. The server stores this file data 54 in disk 29 (FIG. 1).

However, if server 20 or network 46 become inoperative, then client 35 utilizes log file 50 to log entries of data written into file data 52. In accordance with the preferred embodiment of the present invention, client 35 creates and maintains a write file table 56 and a deferred write list 58 for optimizing the entries stored in log file 50 during a period of server unavailability.

Client 35 also has an encoding module 55 and a decoding module 57. During disconnected operations, encoding module 55 places entries of operations performed by the client into log file 50 and write file table 56. Decoding module 57 "replays" or "rolls" the contents of log file 50 by systematically cross-referencing the entries in log file 50 and write file table 56, thereby transferring file data 52 from the client to the server after the server has again become available.

FIG. 3A illustrates a sample of events which will be useful in explaining the operations of the preferred embodiment of the invention. Assuming that the server has become unavailable for communications with the client 35, at point 60 in time, the client writes data to file A. Then, at point 62, the client writes data to file B. At point 64, the client again writes data to file A. This example illustrates two important items with regards to the advantages of the present invention. First, since file A was modified both at event 60 and 64, a conventional linear or sequential log file technique would create separate entries for each of these events and store them separately in the log file. Secondly, since event 64 occurs after event 62, the modification time of file A should be greater than the modification time of file B. As previously explained, it is important that this relationship is maintained upon the completion of the operations which transfer data for files A and B to server 20.

FIG. 3B illustrates the log file 50 utilized by the preferred embodiment of the present invention. Log file 50 has three columns comprised of a record number column 70, a file name column 72, and a sequence number column 74. As will be explained below in greater detail, log file 50 is created during the period of server unavailability, and is deleted after its contents have been used to transfer file data 52 over network 36 to server 20 upon the server becoming available again.

FIG. 3C illustrates the write file table 56 of the preferred embodiment of the present invention. Write file table 76 is used to reduce the number of entries made in log file 50, and also tracks the final state of log file 50. Write file table 56 has three columns including file name column 72, sequence number 76, and a flag 78 indicating whether or not the file has been written as an entry in log file 50.

Write file table 56 is created during normal operations and will contain an initialized entry for each file which is written to by the client during connected operations. For instance, FIG. 3C illustrates a file name C which, having been accessed by the client 35 during normal operations, has an initialized entry in write file table 56. If the client has a disk cache, the write file table 56 will have an entry for each file placed in the client's cache. The entries for files A and B in write file 50, as illustrated in FIG. 3B, will be explained below.

Figure 4A:
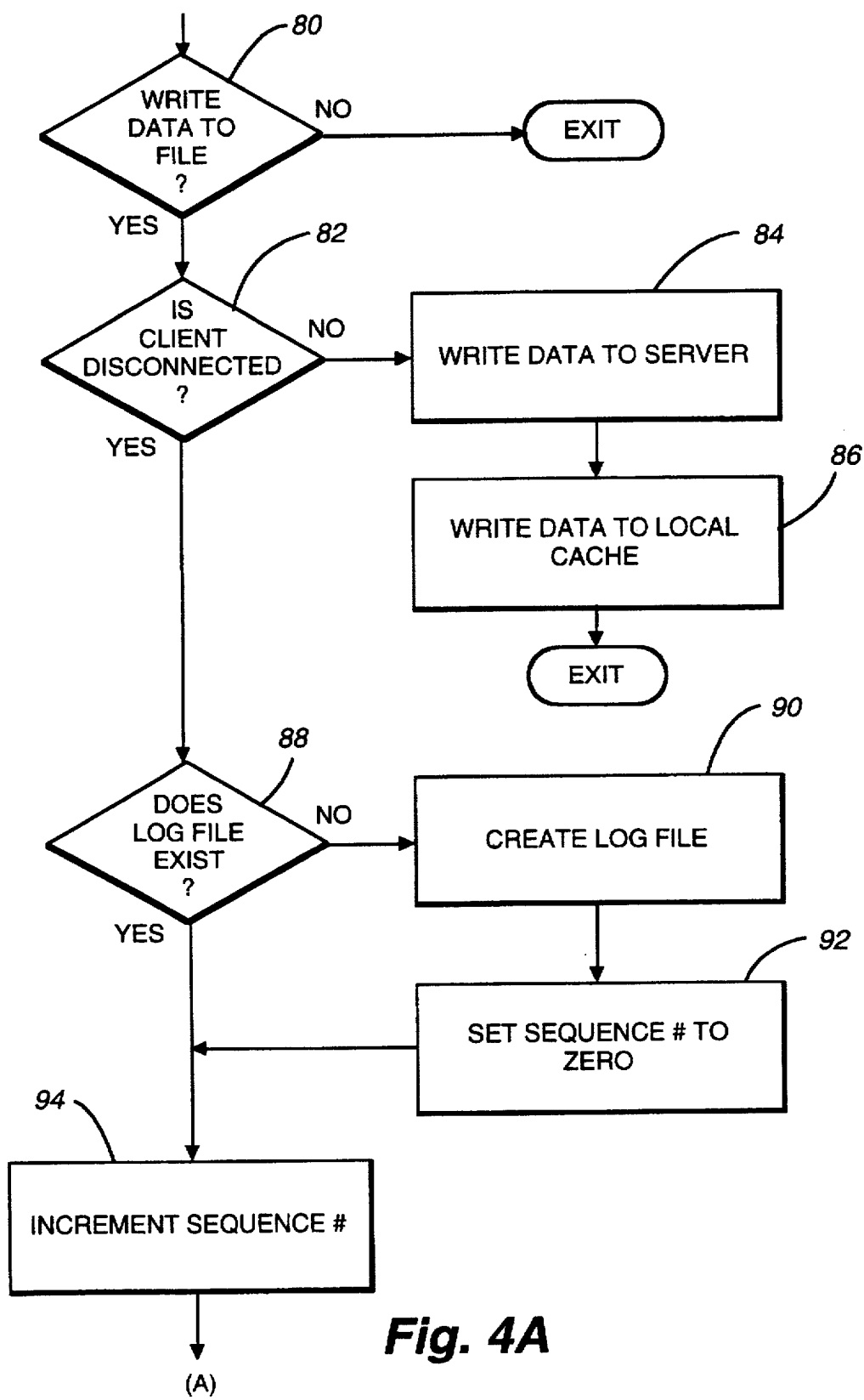
FIG. 4A through FIG. 4B illustrate the logical operations performed by the client during a period of server unavailability to write an entry into the log file 50 using the write file table 56 of FIG. 3C.
Figure 4B:
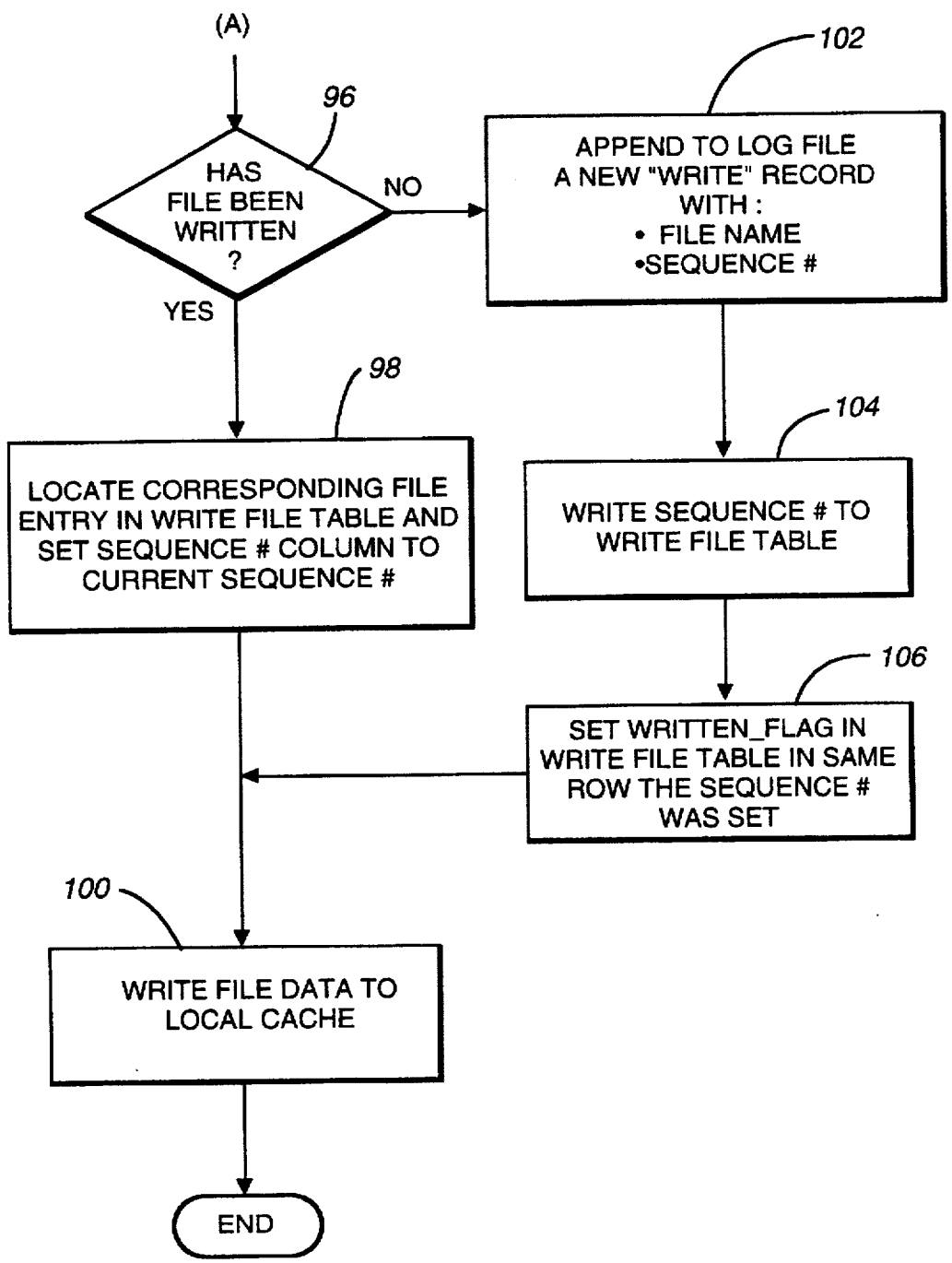

FIGS. 4A–4B illustrate the logical operations performed by the encoding module 55 (FIG. 2) of the preferred embodiment of the present invention while the server is unavailable. The operations illustrated in FIGS. 4A–4B, occur in response to each singular event depicted in FIG. 3A on a per event basis.

Operation 80 initially determines if there is file data 52 (FIG. 2) to be written by client 35. If there is no file data to write, the program exits. If operation 80 determines that there is file data to be written, then operation 82 determines if the client is disconnected (i.e., there is a condition of server unavailability). If the client is not disconnected from server 20 (FIG. 2), then operation 84 writes the file data to the server over network 46, as previously explained. If client 35 is provided with a local cache, then operation 86 writes the file data to the local cache.

In accordance with the present invention, when operation 82 determines that the client is disconnected from the server, operation 88 determines if log file 50 (FIG. 2) already exists. If not, then operation 90 creates a log file containing the components already described in relation to FIG. 3B.

The encoding module 55 maintains a sequence number variable for tracking the state of the disconnected write operations. Operation 92 initializes the sequence number variable to zero after the log file has been created by operation 90. Control is then passed to operation 94. If operation 88 determined that a log file already exists, then control is also passed to operation 94.

At operation 94, the sequence number is incremented for use in the write file table, explained below.

As explained above, the write file table 56 will contain an initialized entry for each file accessed (i.e., placed in the client cache) during normal operations. These initialized entries have a zero in the sequence number column 76 (FIG. 3C) and a zero in the written flag column 78 (FIG. 3C).

Referring to FIG. 4B, during disconnected operations, decision operation 96 determines if the current file to be written in the client has previously been written by the client. Decision operation 96 is performed by examining flag 78 contained in write file table 56 corresponding to the present file referenced by file name 72.

If operation 96 determines that the present file has not been written during disconnected operations, then operation 102 makes a new entry of this file in log file 50. The new entry reflects that data was written to a particular file (identified by file name 72) and the sequence number reflecting the current sequence number stored by client 35. Operation 104 then writes the current value of the sequence number to column 76 of write file table 56. Operation 106 then sets the flag 78 in write file table 56 to reflect the fact that the present file has been entered in log file 50. Write file table 56 now has the present state of the particular file reference in the log file 50. At operation 100, the file data is written to the local disk cache or other storage mechanism in the client.

If operation 96 has determined that the present file has already been written by the client during disconnected operation, then, according to the present invention, no new entries in log file 50 are made for the event. Instead, write file table 56 is appropriately modified to reflect the file data written to the present file.

Operation 98 locates the entry corresponding to the present file in the write file table 56, and the present value of the sequence number, maintained by the encoding module in the client, is written to the sequence number column 76 of write file table 56 (the old sequence number in column 76 is overwritten). After operation 98, operation 100 writes file data 52 to the local disk cache or other persistent storage in the client.

The write file table now has the current state of the log file reflecting events that occurred during disconnected operations. As will be described below, the replay operations or log rolling operations of the present invention will utilize both write file table 56 and log file 50 to accurately recreate the sequence of events which occurred during disconnected operations.

The operations of the present invention will be explained using the scenario described in FIG. 3A using FIGS. 3A and 3B, wherein during disconnected operations, the client must write file data to a file A, then must write different file data to file B, and finally must write different file data to file A.

Assuming that the sequence number maintained by the encoding module has a present value of 1, then beginning at operation 96 and in response to events 1 at point 60 in FIG. 3A, operation 96 would determine that File A has not yet been written because the written flag of write file table 56 would contain a zero corresponding to file name A (not shown). Operation 102 would append an entry in log file 50 for file name A, using a sequence number of 1. Operations 104 and 106 would then overwrite the value of the sequence number contained in the table (changing the sequence number from an initialized zero to the present value of the sequence number 1), and set the written flag to 1. Operation 100 would then write the file data for file A into the local cache or other file storage medium in the client.

In response to event 2 occurring at point 62 (FIG. 3A), operation 94 would increment the current sequence number to a value of 2, and operations 96, 102-106, and 100, would operate in the same manner as with event 1 as previously described, except that the sequence number used now has the value of 2.

Assuming event 3 occurs at point 64 (FIG. 3A) wherein new file data is written again to file A, then after incrementing the sequence number to 3 at operation 94, operation 96 detects that file A has already been written in the log file by examining the written flag 78 in the write file table 56 (the flag is set to 1). Hence, operation 96 passes control to operation 98 which overwrites the sequence number in the sequence column 76 with the present value of the sequence number (i.e., 3) for file name A, as shown in FIG. 3C. No additional entries are made in log file 50 for this event. Operation 100 then writes the new data into file A in the client's local disk cache or other media.

As this example illustrates, the number of entries in log file 50 were reduced where the events occurring in the client included a write operation to the same file occurring at different times.

Figure 5:
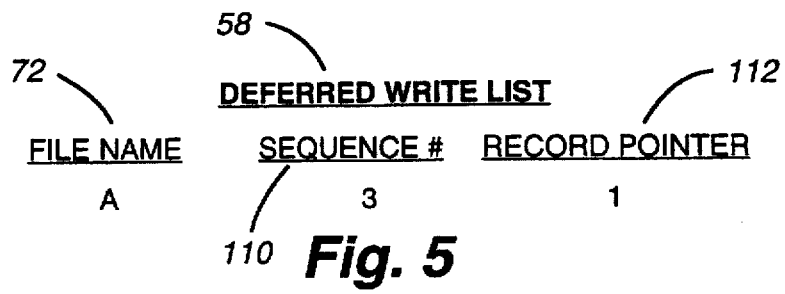
FIG. 5 illustrates a deferred write list utilized in the preferred embodiment of the present invention.
Figure 6A:
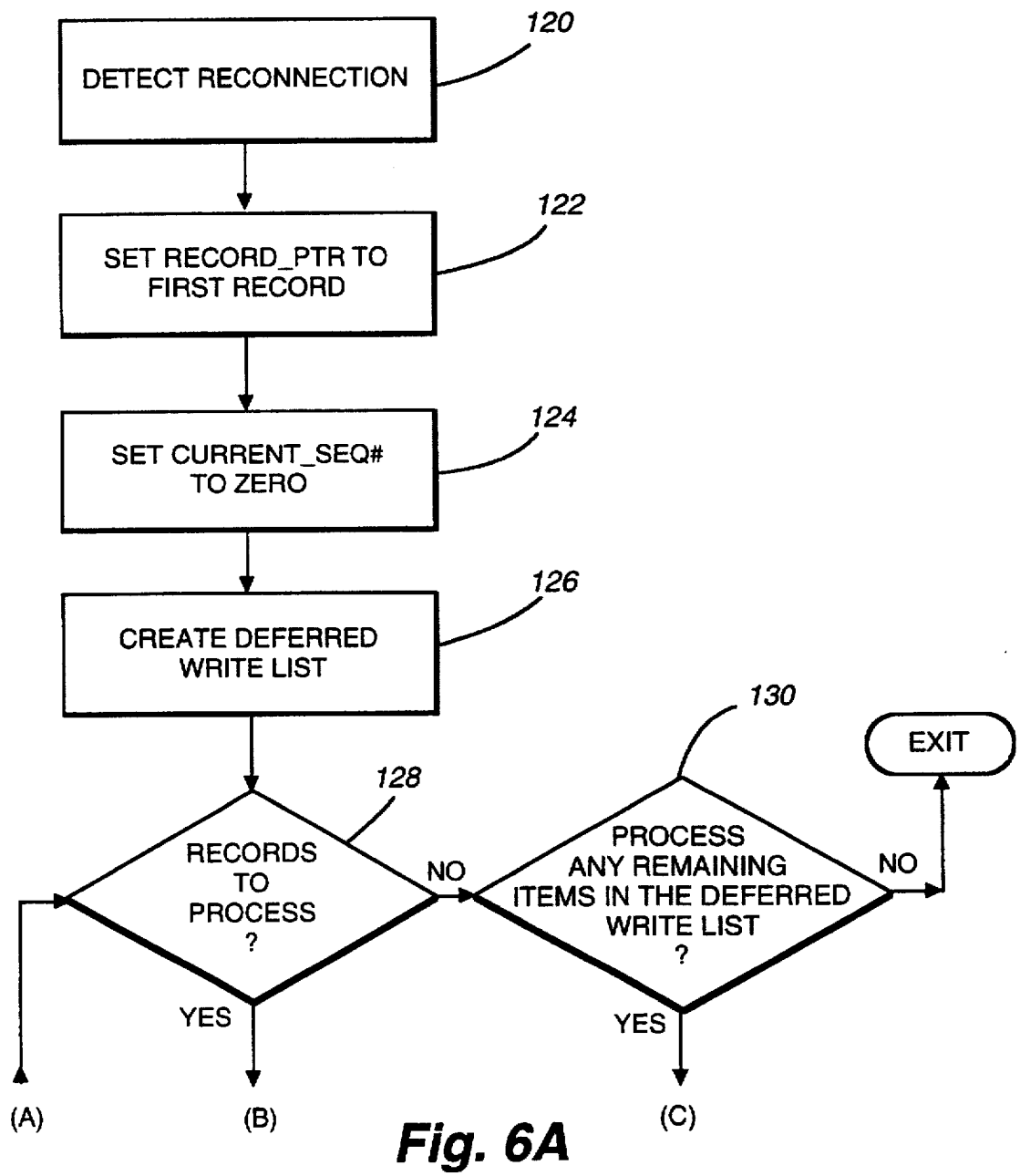
FIG. 6A through FIG. 6B illustrate the logical operations performed by the client, after the server has again become available, to "replay" or "roll" the contents of the log file to the server.
Figure 6B:
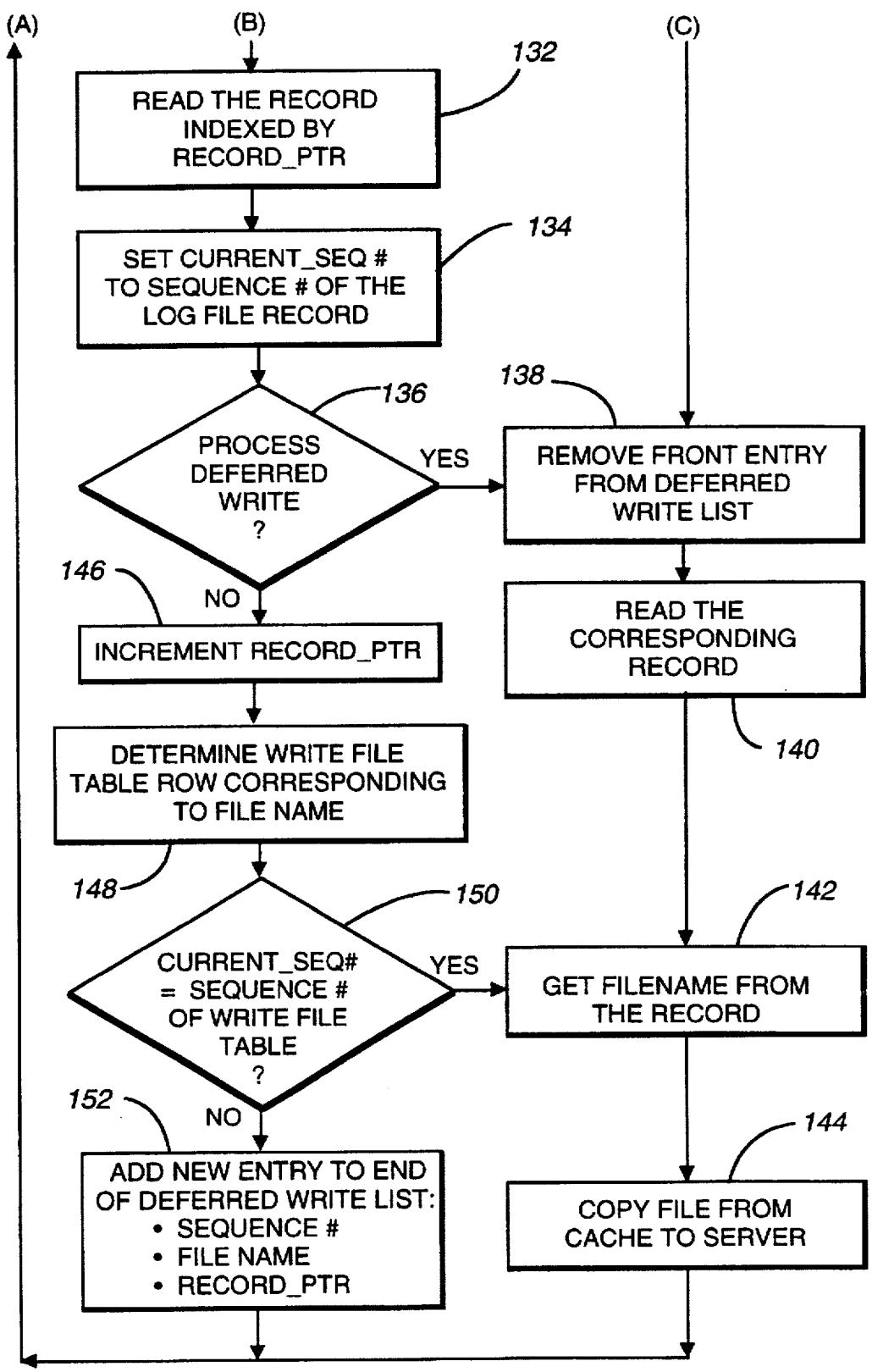

FIGS. 5, and 6A-6B are used by the decoding module 57 of the preferred embodiment of the present invention after the server has again become available. The client's primary goal after reconnection with the server involves the transfer of the most recent data for each file over the network to the server so that the server can write this data to its storage devices.

Deferred write list 58 is used by the decoding module to ensure that the relative sequence of file modifications which occurred on the client during disconnected operations is preserved during the replay or rolling of events stored in the log file and write file table. In general, for a given file having an entry in log file 50, the sequence number for an entry in the log file, obtained from column 74 (FIG. 3B), is compared to the sequence number of a corresponding entry in the write file table, obtained from column 76 (FIG. 3C). If these sequence numbers match, then the file data for that file is transferred from the client to the server for storage therein. If these sequence numbers do not match, replaying this entry at the present time would be premature. The decoding module therefore places this entry in the deferred write list so that the file data referenced by this entry can be transferred to the server at a time which would properly preserve the order of events.

FIG. 5 illustrates the components of deferred write list 58. Column 72 of deferred write list 58 reflects the file name of the particular entry in list 58, while sequence number 110 reflects the sequence number derived from column 76 of write file table 56. Record pointer column 112 reflects the record number column 70 from log file 50.

The decoding module maintains two variables in the replay of events. A record pointer variable (RECORD_PTR) is read from the record number column 70 of the log file, and the current sequence number (CURRENT_SEQ#) is read from the log file for comparison to the sequence number contained in the write file table.

Referring to FIGS. 6A-6B, the logical operations of the decoding module are illustrated. Operation 120 detects reconnection of the client to the server. Operation 122 sets the RECORD_PTR (not shown) to the first record 70 contained in log file 50. Operation 124 initializes the current sequence number to zero.

Operation 126 creates a deferred write list 58 in the client, explained above. Operation 128 determines if there are any records in log file 50 to process. If there are no remaining records to be processed, operation 130 checks the contents of the deferred write list 58 for processing of any remaining items contained therein. If there are no entries in the deferred write list, the program terminates. If there is an entry in the deferred write list, control passes to operation 138, described below.

If operation 128 determines that there are records to process, then operation 132 reads the next record indexed by the record pointer of the log file. Operation 134 sets the current sequence number maintained by the decoding module of the client to the sequence number of the present entry of the log file record.

Operation 136 determines if it is time to process a deferred write contained in list 58. If the write deferred write list 58 is empty, then control passes to operation 146. If list 58 has an entry, then operation 136 compares the current sequence number, obtained by operation 134, to the sequence number in column 110 of the front entry of the deferred write list 58. If the current sequence number is greater than or equal to the sequence number of the front entry of the deferred write list, then it is time to process this deferred write entry contained in list 58. Operation 138 removes this front entry from the deferred write list for processing. Operation 140 reads the corresponding record contained in the front entry, while operation 142 gets the file name from the record. Operation 144 then copies the file, referenced by the record, from the client to the server for storage therein. The front entry can then be removed from the deferred write list.

If operation 136 determines that there are no deferred write entries for processing at this time, then operation 146 increments the record pointer to the next record in the log file. Operation 148 locates the row in write file table 56 corresponding to the file name of the particular entry being processed. Operation 150 determines if the present entry of the log file should be written to the deferred write list 58. Operation 150 makes this determination by comparing the current sequence number to the sequence number of the write file table 56. If these sequence numbers match, then the current entry being processed need not be added to deferred write list 58, and control is passed to operation 142 and 144, described above.

If, however, the sequence numbers compared by operation 150 do not match, then operation 152 adds a new entry to the end of the deferred write list. The new entry includes the sequence number of the entry, copied from sequence number column 76 of the write file table 56, the file name of the entry, and a record pointer of the entry, copied from column 70 of log file 50.

Both operations 152 and 144 pass control back to operation 128 for subsequent processing of any entries contained in either the write file table or the deferred write list.

The operations of the present invention will be described with reference to FIG. 5, and 6A–6B using the example of FIG. 3B–3C, wherein during disconnected operations, the client wrote file data to a file A, then different file data to file B, and finally different file data to file A.

Beginning with operation 132, the first record in log file 50 (FIG. 3B) is read. Operation 134 sets the current sequence number to 1, the sequence number of the current record from the log file. Since this is the first record, operation 136 determines that there can be no records in the deferred write list, thereby passing control to operation 146 which increments the record pointer to the second record in the log file for the next iteration.

Operation 148 locates the entry in write file table 56 corresponding to the file name of the present record (i.e., file name A). Operation 150 then compares the current sequence number (i.e., 1) to the sequence number corresponding to file A in the write file table (i.e., 3). Because these sequence numbers do not match, operation 150 passes control to operation 152 wherein a new entry is made in the deferred write list for file name A having a sequence number of 3, as shown in FIG. 5. Control is then returned to operation 128.

Upon the second iteration of the logical operations, operation 132 reads the next record in log file 50 (i.e., file B with sequence No. 2). Operation 134 sets the current sequence number to the value of 2, and operation 136 compares the current sequence number (i.e., 2) to the sequence number contained in column 110 of the deferred write list (i.e., 3). Because the current sequence number (i.e., 2) is less than the sequence number in column 110 (i.e., 3), it is not yet time to process the entry contained in the deferred write list. Therefore, control is passed to operation 146, then to operation 148 which reads the write file table entries corresponding to file name B. Operation 150 then compares the current sequence number (i.e., 2) to the sequence number in column 76 of write file table 56 corresponding to file name B (i.e., 2). Since these sequence numbers match, operation 142 and 144 copy the file data for file B from the client to the server.

Control is then passed to operation 128 for another iteration. Operation 132 reads the third record in the log file, and operation 134 sets the current sequence number to a value of 3. Operation 136 compares the current sequence number (i.e., 3) to the sequence number in column 110 of deferred write list 58, and since these numbers are equal, control is passed to operation 138 which removes this entry from the deferred write list so that the file data referenced by this entry can be transferred to the server.

As illustrated by this example, the file data for file B was transferred to the server before the file data for file A. Hence, from the server's perspective, file B was modified earlier than file A. This accurately reflects the order of file modifications which occurred while the server was disconnected. Therefore, the present invention preserves the relative order of file modifications during disconnected operations.

Using the methods and apparatus of the preferred embodiment of the present invention, the size of the log file will be governed by the number of files accessed during disconnected operations. Conventional sequential logging techniques have log file sizes which are proportional to the number of write operations performed on the client during disconnected operations, which can grow quite large for multiple write operations on a single file. Hence, a substantial reduction in the log file size can be achieved by the use of the present invention.

After the operations of FIG. 6A–6B are completed and the file data has been successfully transferred to the server, the decoding module can perform various housekeeping functions such as deleting the deferred write list 58, deleting the log file 50, and re-initializing columns 76 and 78 of the write file table 56. Hence, efficient operations in the client are archived.

Depending on the hardware components of the client workstation 35, log file 50, write file table 56, and deferred write list 58 can be maintained by client 50 in memory or in persistent storage such as a disk drive (not shown). A disk drive provides the benefit of greater data reliability in the event of fluctuations in the power provided to the client workstation.

While the invention has been particularly shown and described with reference to a preferred embodiment thereof, it will be understood by those skilled in the art that various other changes in the form and details may be made therein without departing from the spirit and scope of the invention. For instance, the preferred embodiment has described write file table 56 and deferred write list 58 as components maintained separately from log file 50 (FIG. 2). It will be understood that the components of table 56 and list 58 could be incorporated into log file 50 to form a single file. The particular implementation and maintenance of log file 50, write file table 56, and deferred write list 58, is a matter of choice of the particular system developer.

What is claimed is:

1. In a client computing station which communicates over a network with a server, a method for reducing the number of entries placed in a log file during disconnected client write operations, the method comprising the computer implemented steps of:

creating a write file table for tracking the file name and a sequence number of entries placed in the log file during disconnected operations;

maintaining a count of the sequence number of a present write operation;

encoding the log file with entries identifying the file name and the sequence number of the present write operation;

detecting a first condition wherein the present write operation operates on the same file as a prior write operation; and upon detecting said first condition, updating the sequence number in the write file table corresponding to the present write operation, thereby encoding the write file table for subsequent decoding.

2. The method of claim 1, further comprising:

upon detection of server availability, processing the entries contained in the log file by referencing the information contained in the write file table;

detecting the proper sequence of transfers of file data from the client to the server; and transferring to the server the data stored on said client corresponding to the entries contained in said log file.

3. An apparatus for efficiently replaying the entries placed in a log file during disconnected client write operations, said apparatus comprising:

an encoding module for placing said entries in said log file;

a write file table for tracking the state of said log file;

a decoding module for replaying the write operations maintained in the log file, said decoding module accessing said write file table for replaying said write operations in the correct order; and a deferred write list for temporarily storing entries for replaying at the appropriate moment.

* * * * *